US008135707B2

(12) United States Patent
Mika

(10) Patent No.: US 8,135,707 B2
(45) Date of Patent: Mar. 13, 2012

(54) USING EMBEDDED METADATA TO IMPROVE SEARCH RESULT PRESENTATION

(75) Inventor: Peter Mika, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 475 days.

(21) Appl. No.: 12/056,422

(22) Filed: Mar. 27, 2008

(65) Prior Publication Data

US 2009/0248658 A1    Oct. 1, 2009

(51) Int. Cl.
*G06F 7/00* (2006.01)
(52) U.S. Cl. .................. 707/723; 707/796
(58) Field of Classification Search .............. None
See application file for complete search history.

(56) References Cited

U.S. PATENT DOCUMENTS

| 5,907,837 A * | 5/1999 | Ferrel et al. ............ 707/3 |
| 6,678,679 B1 * | 1/2004 | Bradford ............... 707/5 |
| 7,779,036 B2 * | 8/2010 | Subramanian et al. ..... 707/791 |
| 7,921,137 B2 * | 4/2011 | Lieske et al. ........... 707/802 |
| 2007/0266022 A1 * | 11/2007 | Frumkin et al. ......... 707/5 |
| 2007/0294240 A1 * | 12/2007 | Steele et al. ........... 707/5 |
| 2008/0097985 A1 * | 4/2008 | Olstad et al. ........... 707/5 |

OTHER PUBLICATIONS

Ben Adida, hGRDDL: Bridging microformats and RDFa, (ScienceDirect) Web Semantics: Science, Services and Agents on the World Wide Web 6 (2008) 54-60, available online Nov. 17, 2007.*
Alexander Graf, RDFa vs. Microformats, DERI Technical Report Apr. 10, 2007.*
Hunter, Jane (2001) MetaNet: A Metadata Term Thesaurus to Enable Semantic Interoperability Between Metadata Domains. Journal of Digital Information 1 (8). available at http://espace.library.uq.edu.au/view/UQ:7877 (retreived Dec. 13, 2011).*
Brian Kettler, James Starz, William Miller and Peter Haglich, Template-Based Markup Tool for Semantic Web Content, The Semantic Web—ISWC 2005 Lecture Notes in Computer Science, 2005, vol. 3729/2005, 446-460. available at http://www.springerlink.com/content/bp4x608624032033/ (retreived Dec. 13, 2011).*
Klapsing, R.; Neumann, G.; Conen, W.; , "Semantics in Web engineering: applying the Resource Description Framework," Multimedia, IEEE , vol. 8, No. 2, pp. 62-68, Apr.-Jun. 2001. Available at http://ieeexplore.ieee.org/stamp/stamp.jsp?tp=&arnumber=917972&isnumber=19845 (retreived Dec. 13, 2011).*

* cited by examiner

*Primary Examiner* — Christyann Pulliam
(74) *Attorney, Agent, or Firm* — Seth H. Ostrow; Ostrow Kaufman LLP

(57) ABSTRACT

The present invention is directed towards systems and methods for using metadata to improve search result presentation. The method according to one embodiment of the present invention comprises receiving a search query from a user and parsing the search query and retrieving a ranked list of search results. The method then extracts metadata from the search results and casts the extracted metadata into an object model. A template is then applied to the cast extracted metadata and a search results page is generated comprising the ranked list of search results and the templated metadata.

24 Claims, 3 Drawing Sheets

USING EMBEDDED METADATA TO IMPROVE SEARCH RESULT PRESENTATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to improving the quality of search results pages. More specifically, the present invention is directed towards systems, methods and computer program products for improving a search results page by presenting concise search result information on the basis of metadata within the search results page.

BACKGROUND OF THE INVENTION

As the volume of content available on the Internet exponentially expands, the role of search engines in allowing users to quickly and efficiently locate relevant data has become ever more necessary. Early, and to some extent, present-day search engines receive user queries, query an index of content items and provide a ranked list of results for the given query. Generally, a given item in the ranked list comprises a link title corresponding to the HTML <title> tag of the search result and a snippet of text present within the page (also referred to as a page abstract).

This methodology provides a quick, easy and efficient way to present relevant results for a given search query. This method, however, ignores the structured nature of the Internet and provides users with the bare minimum in response to a query. Subsequent solutions have involved providing search results templates to add additional detail for a given search result. For example, a user query for a film title may result in a search result having a link, as previously described, as well as a plurality of links contained within the main result that relate to the film (e.g., showtimes, synopsis, etc.). This approach provides the user with substantially more detail and allows the user to access these pages without navigating away from the search results page, but is a somewhat "hard-coded" solution, which tends to be inflexible.

These systems and methods fail to capitalize on the semantic nature of web technologies such as Extensible Hypertext Markup Language (XHTML), Resource Description Framework (RDF), Embedded Resource Description Framework (eRDF), Resource Description Framework-In-Attributes (RDFa) and microformats. Additionally, a templating scheme, as described, may be functional in one domain but may be unusable in a disparate domain. Thus, there is a need in the art for a system and method for creating generic snippets of search results based on extracting metadata from the search result page itself and presenting this snippet to a user on a search results page.

SUMMARY OF THE INVENTION

The present invention is directed towards systems, methods and computer program products for using metadata to improve search result presentation. The method of the present invention comprises receiving a search query from a user and parsing the search query to retrieve a ranked list of search results. The method extracts metadata from the search results. Metadata may comprise microformat data or alternative metadata technologies including, but not limited to, RDF, eRDF or RDFa data. In one embodiment, metadata is embedded into a webpage. In an alternative embodiment, metadata is linked from a webpage.

The method casts the extracted metadata into an object model and applies a template to the cast extracted metadata. In one embodiment the templated metadata is contextualized based on the search query. In an alternative embodiment, the method may further comprise storing the templated metadata, wherein the stored templated metadata is associated with a given search result and wherein the templated metadata is retrieved via a metadata search engine.

The method generates a search results page comprising the ranked list of search results and the templated metadata. In one embodiment, the method may further generate advertisements for display on a search results page, which may be based upon the content of the metadata.

The system of the present invention comprises a plurality of client devices coupled to a network and a query parser operative to parse a search query and retrieve a ranked list of search results. The system further comprises a search results database operative to store a plurality of search results and a sponger operative to extract metadata from the search results and cast the extracted metadata into an object model. Metadata may comprise microformat data or alternative metadata technologies including, but not limited to, RDF, eRDF or RDFa data. In one embodiment, metadata is embedded into a webpage. In an alternative embodiment, metadata is linked from a webpage.

The system further comprises a templating module operative to apply a template to the cast extracted metadata. In one embodiment, templated metadata is contextualized based on the search query. In alternative embodiment, the templating module is operative to store the templated metadata, wherein the stored templated metadata is associated with a given search result. The templated metadata may be retrieved via a metadata search engine.

The system further comprises a content server coupled to the network, the content server operative to receive a search query from a user and generate a search results page comprising the ranked list of search results and the templated metadata. In one embodiment, generating a search results page further comprises generating advertisements for display on a search results page, which may comprise selection of advertisements on the basis of the content of the metadata.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
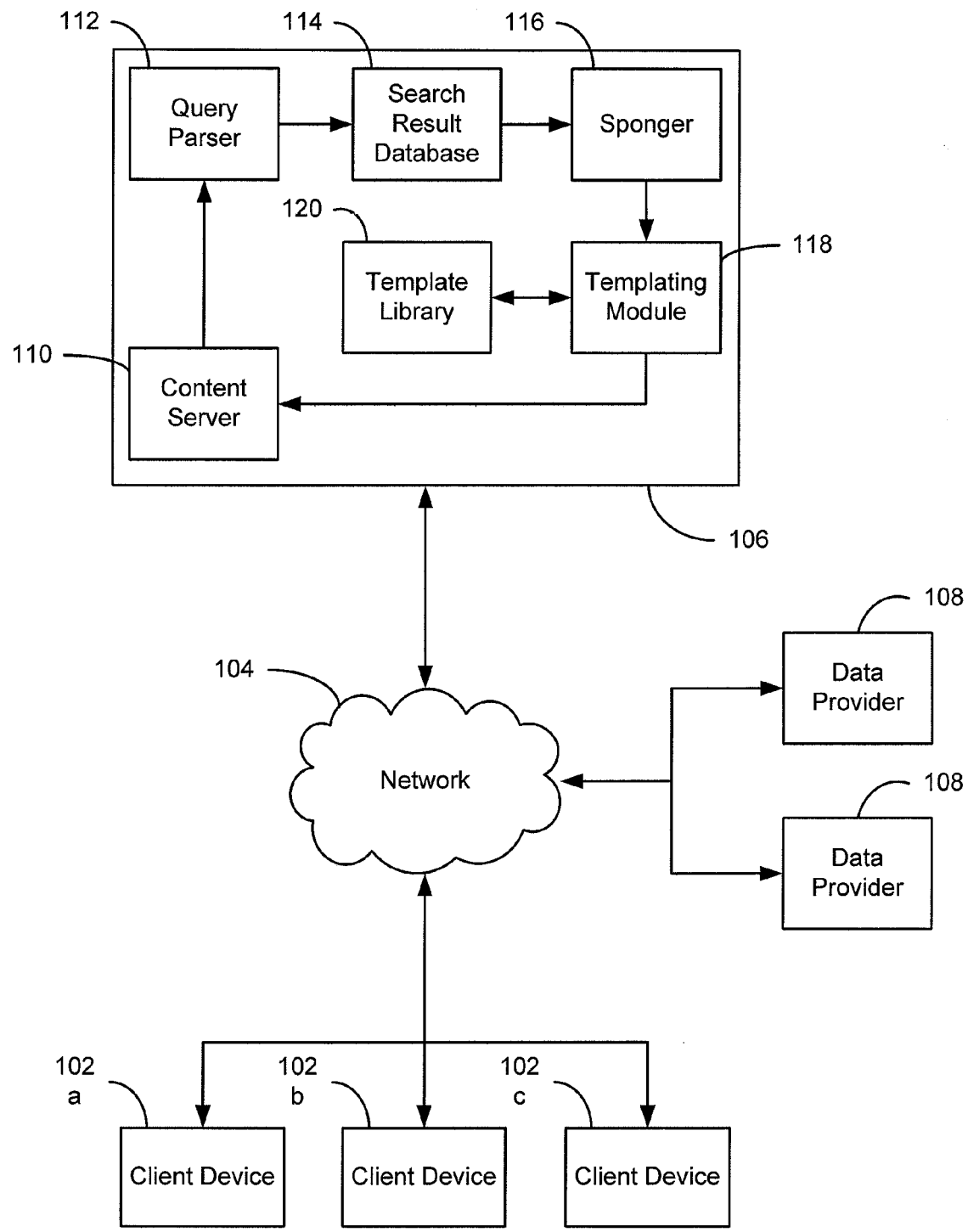
FIG. 1 presents a block diagram depicting a system for using embedded metadata to improve search results presentation according to one embodiment of the present invention.

FIG. 1 presents a block diagram depicting a system for using embedded metadata to improve search results presentation according to one embodiment of the present invention. According to the embodiment that FIG. 1 illustrates, at least a plurality of client devices 102a, 102b and 102c are communicatively coupled to a network 104, which may include a connection to one or more local or wide area networks, such as the Internet. A given client device 102a, 102b and 102c is in communication over the network 104 with a content provider 106. Additionally, client device 102a, 102b and 102c, as well as content provider 106, may be communicatively coupled with data providers 108. In one embodiment, data providers 108 may comprise third party content providers operative to serve data linked to from a search results page.

According to the present embodiment, a content provider 106 comprises a content server 110 operative to receive data requests from a given client device 102a, 102b and 102c and return appropriate or otherwise relevant data in response to the received data requests. In the illustrated embodiment, content server 110 is operative to receive a request for search results from a given client device 102a, 102b, 102c. In one embodiment, a request for search results comprises an HTTP request received via a user form submission, such as via an HTML form element.

Content server 110 is in communication with query parser 112, which is operative to receive the user query and parse the query into a format for accessing a search result database 114. For example, query parser 112 may be operative to translate Boolean queries into statements formatted for accessing the search result database 114. Search result database 114 comprises a database structure operative to store search results for retrieval via database access statements, e.g., Structured Query Language ("SQL") statements. The operation of query parser 112 and search result database 114 are well known in the art and are not be described in further detail for the clarity.

After retrieving a plurality of search results for a given user query, the one or more items comprising the search results are forwarded to a sponger 116. In one embodiment, search result database 114 transmits a top N number of search results to the sponger 116 for further analysis. A top N number may be predetermined within the content provider 106 or, alternatively, may be determined according to user preference. The sponger 116 is operative to extract metadata from the plurality of forwarded search results, and may extract metadata following pre-defined metadata embedded in, or linked to by a webpage including, but not limited to microformats, RDF, eRDF or RDFa. Microformats are commonly used in XHTML compliant webpages to describe page constructs. For example, an HTML source comprising contact information may be written as follows:

```
<div>
    <div>John Doe</div>
    <div>John's Company</div>
    <div>CEO</div>
```

```
    <div>212-555-1234</div>
    <a href="http://example.com/">http://example.com/</a>
</div>
```

EXAMPLE 1

As can be seen in Example 1, the HTML source does not provide adequate metadata for describing contact information. Consequently, extracting metadata from the code snippet shown in Example 1 is accomplished by making educated guesses about content in webpages; such a technique is called "screen scraping". The use of microformats, however, allows computer-based parsers to quickly identify and standardize such data without the overhead of intensive text processing. Example 2 illustrates a data structure utilizing the hCard microformat for describing the same contact information presented in Example 1.

```
<div class="vcard">
    <div class="fn">John Doe</div>
    <div class="org">John's Company</div>
    <div class="role">CEO</div>
    <div class="tel">212-555-1234</div>
    <a class="url" href="http://example.com/">http://example.com/</a>
</div>
```

EXAMPLE 2

As can be seen, Example 2 adds "class" attributes to the DIV elements of Example 1, to standardize the elements of a contact information snippet and to succinctly provide descriptors of the data. This microformat allows computer parsers to quickly identify data and extract this data from a webpage.

The sponger 116 is operative to parse one or more search results and extract such metadata formatted in accordance with a variety of microformats. In one embodiment, sponger 116 may be given a set of microformats to locate with search results pages (e.g., hCard, hCalender, hResume, etc). Upon detecting metadata within a search results page, the sponger 116 locates the appropriate object model for the identified metadata and casts the metadata according to the model format. The sponger 116 transmits the metadata that it extracts and search results pages to templating module 118.

Templating module 118 is operative to receiving a plurality of search results and metadata objects and formats a search results page listing according to one or more object templates stored within template library 120. In one embodiment, template library 120 is operative to store one or more templates, a given template corresponding to a given microformat. For example, template library 120 may comprise a template for contact information that is associated with the hCard microformat that displays information in an inline list below a search result.

Templating module 118 is operative to utilize a retrieved template from template library 120 and combine the search result with the templated metadata. For example, a search result for the page "www.example.com" containing the microformat data illustrated in Example 2 may be formatted as illustrated in Example 3.

```
1:  <div><a href="http://www.example.com/">John's
    Company</a>John's Company, Official Website...</div>
2:  <div>CEO, John Doe,
3:  <a href="" onclick="call( );">212-555-1234</a></div>
4:  <a href="" onclick="addToAddressBook( );">Add to Address
    Book</a>
```

EXAMPLE 3

As illustrated in Example 3, a search result may be templated to contain the standard search result link (line 1) and one or more templated metadata items (lines 2-4). As can be seen, a template for an hCard may employ linking the metadata phone number to a function enabling the user to call the phone number via a Voice Over Internet Protocol (VoIP) service (line 3, "call()"function). Additionally, the template may allow a user to add the hCard identity to his or her address book (line 4, "addToAddressBook()"function). It should be noted that the illustrated embodiment of Example 3 is intended for exemplary purposes only, and template may perform additional features as well as display substantially different data extracted from the microformat metadata.

After templating the extracted metadata, templating module 118 transmits the templated modules and search results to content server 110. In response, content server 110 assembles the final search results page and transmits the search results page to a given client device 102*a*, 102*b* and 102*c*. In alternative embodiments, content server 110 generates a plurality of advertisements for placement in the final search results page. In this embodiment, advertisements may be based on data present within the metadata. For example, if a given metadata object contains a latitude/longitude pair, the system may select an advertisement related to the metadata position for display in the search results page.

Figure 2:
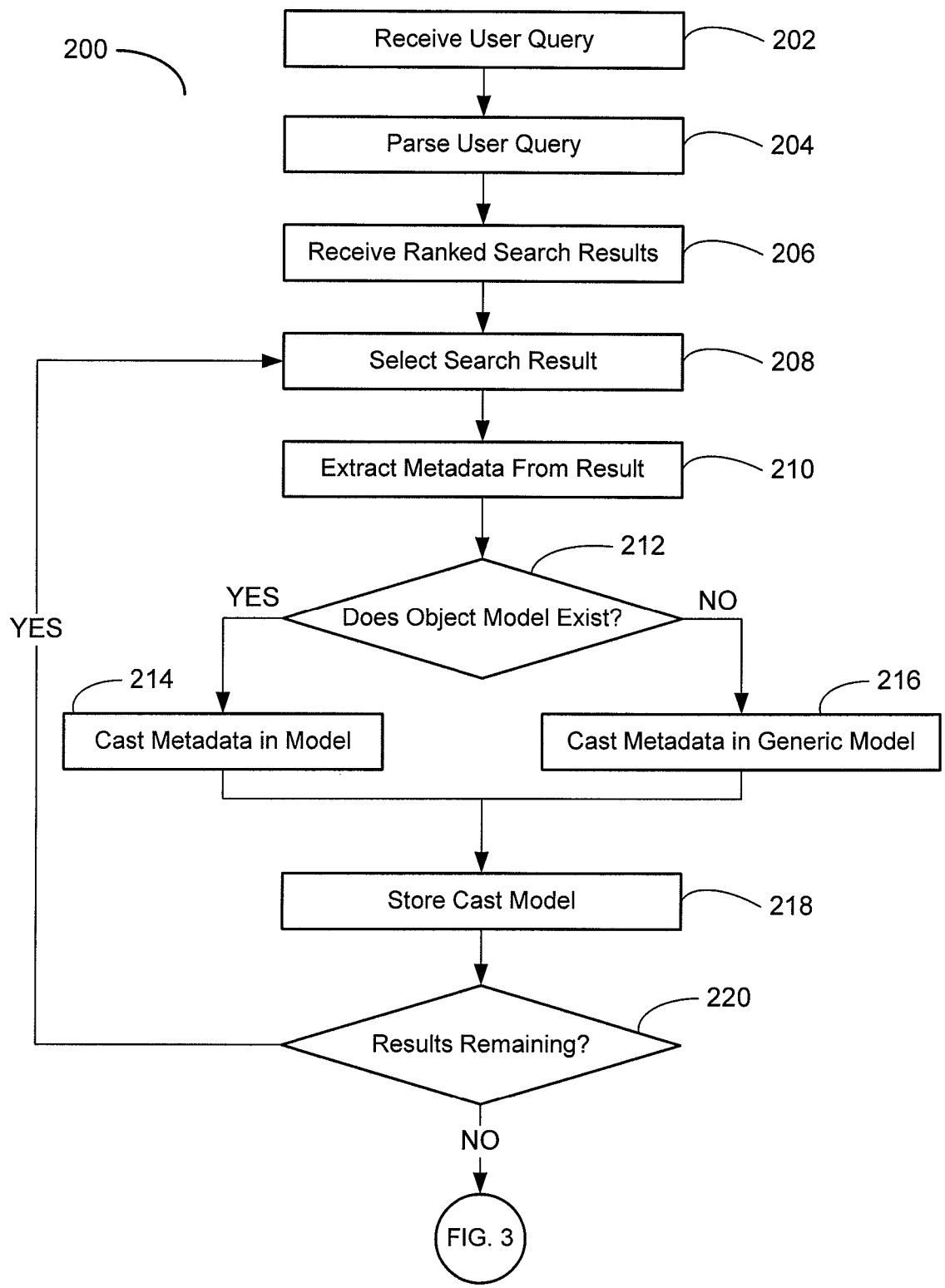
FIG. 2 presents a flow diagram illustrating a method for generating an object model on the basis of extracted search results metadata according to one embodiment of the present invention.

FIG. 2 presents a flow diagram illustrating a method for generating an object model on the basis of metadata extracted from search results according to one embodiment of the present invention. As FIG. 2 illustrates, the method 200 receives a user query, step 202. In one embodiment, a user query is received via a form submission to a content provider. In an alternative embodiment, a user query may be submitted in response to the selection of a hyperlink containing a plurality of search parameters.

The method 200 parses the received user query to formulate a statement operative to access a database of search results, step 204. In one embodiment, parsing a query may comprise formulating a Boolean statement from a natural language query that a user submits. Additionally, or in conjunction with the foregoing, the method 200 may utilize alternative terms (e.g., word replacement) to maximize the efficiency of the user query. Upon parsing the user query, the method 200 receives one or more ranked search results, step 206. The process of generating a list of ranked search results in response to a user query is well known in the art and may be performed in accordance with these well known techniques.

The method 200 selects a given search result from the one or more search results, step 208, and extracts metadata from the result, step 210. As previously discussed, extracting metadata may comprise parsing an XHTML document and identifying subsections of the XHTML document that correspond to metadata structures. In one embodiment, the method 200 scans an XHTML document to identify microformat data present within the XHTML, or additional metadata formats embedded or linked to by a webpage, such as RDF, eRDF or RDFa. The method 200 may be operative to temporarily store the identified metadata in memory for processing, or alternatively, may be operative to save the located metadata to disk for long-term processing.

Metadata is extracted from the search result and the method 200 determines if the identified metadata corresponds to an object model, step 212. In one embodiment, an object model comprises a data structure operative to represent the extracted microformat metadata. For example, the method 200 may extract hCard microformat metadata in step 210 by identifying an HTML DIV element having a class "vcard". Upon detecting this metadata, the method 200 queries a metadata object model library to determine if there exists a model for representing this hCard metadata (step 212).

If the method 200 determines that an object model exists, the method 200 casts the metadata according to the retrieved model, step 214. If the method 200 determines that a model does not exist, the method 200 may cast the metadata in a generic model, step 216. In one embodiment, casting metadata in an object model may comprise casting the metadata in a global format useable by the method 200 in further processing. For example, an object model may comprise an XML document describing the metadata. Although step 216 illustrates casting metadata in a generic model, alternative embodiments may exist wherein the method 200 merely discards metadata not fitting an object model, rather than cast into a generic model.

The method 200 stores the cast model, step 218. In one embodiment, this storage step comprises storing the cast metadata in memory, or temporary disk storage for on-the-fly processing. Alternatively, the method 200 may maintain a persistent copy of the cast model. In this embodiment, the method 200 is operative to associate the stored cast models with the search results pages to enable faster subsequent processing. The method 200 determines whether there are search results remaining for processing, step 220. If results remain, the method 208, 210, 212, 214, 216, 218 and 220 repeats for the remaining results. Alternatively, the method 208, 210, 212, 214, 216, 218 and 220 may only repeat for a predetermined number of search results. Upon analyzing a number of results, which may be a predetermined number of results, the method 200 proceeds to the method of FIG. 3, which is described in greater detail below.

Figure 3:
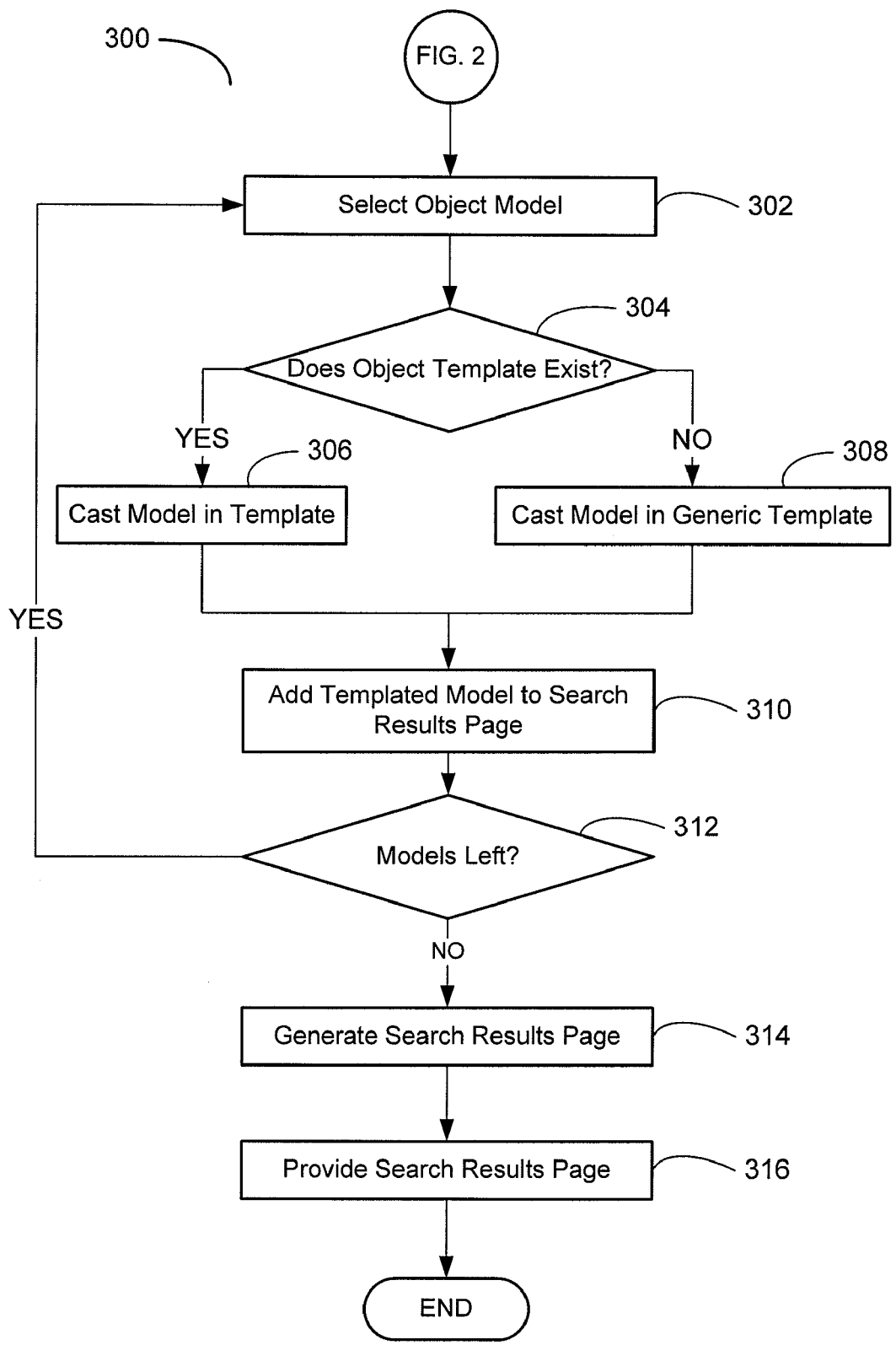
FIG. 3 provides a flow diagram illustrating a method for generating a search results page with extracted metadata content according to one embodiment of the present invention.

FIG. 3 provides a flow diagram illustrating a method for generating a search results page with extracted metadata content according to one embodiment of the present invention. As FIG. 3 illustrates, the method 300 selects a given object model that the method 200 generates, step 302. The method 300 determines whether an object template exists for the selected object model, step 304.

If the object template exists, the model is cast into the associated template, step 306. If not, the model is cast into a generic template, step 308. As previously described, a template may comprise formatting instructions with regard to display of the object data within the context of a search results page. For example, a template may identify the position of elements, the hyperlink URLs for parameters as well as additional functionality, such as VoIP calling features, address book functions, etc. These templates may be stored in a separate template storage module, separating the data from the presentation, thereby allowing either data or presentation to be modified without modification to the other. It should be noted, that the method 300 may simply discard objects that do not have corresponding templates, rather than applying a generic template as shown in step 308.

The templated model is added to a search results page, step 310. Adding a templated model to a search results page may comprise appending the search result and templated model to a list of search results and templated models. For example, a final search result page may comprise a top banner, a right column for advertisements, a left column for search results and a footer. In one embodiment, adding a templated model may comprise generating the data entered into the left column of the final page. In one embodiment, this adding step comprises storing the templated metadata in memory or temporary disk storage for on-the-fly processing. Alternatively, the method 300 may permanently store the templated metadata wherein a metadata search engine is utilized to retrieve the cast model. The method 300 determines if there are additional models remaining to be templated, step 312. If so, the method performed in steps 302, 304, 306, 308, 310 and 312 is repeated.

If no models remain for templating, the method 300 generates a final search results page, step 314. In one embodiment, a final search results page is generated by utilizing a search results page template and inserting the generated model templates and search results generated as described above. Alternatively, or in conjunction with the foregoing, generating a final search results page may comprise generating dynamic content based upon the received templated models. For example, a final search results page may comprise a plurality of advertisements that may be determined based on the content of the extracted metadata models. After generating the final search results page, the method 300 provides the search results page to a user, step 316. In one embodiment, providing a final search results page may comprise transmitting the search results page via an HTTP response to an HTTP query request. In an alternative embodiment, the templated metadata may be contextualized by taking the user's query into account.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

I claim:

1. A method for using metadata to improve search result presentation, the method comprising:

receiving a search query from a user;

parsing the search query and retrieving a ranked list of search results;

extracting metadata from one or more subsections of a markup language document for each of the search results, the metadata embedded within the markup language document in accordance with a given one of a plurality of formats that semantically identifies a specific construct of the metadata in the markup language document, the given format including class attributes that are unique to the given format of the plurality of formats;

casting the extracted metadata into an object model representing the metadata in the given format applying the metadata casted in the object model to a given object template based on the object model, the given object template including instructions associated with displaying the metadata on the basis of the given format and linking the metadata to one or more functions based on the given format; and generating a search results page comprising the ranked list of search results and the metadata according to the given object template.

2. The method of claim 1 wherein the metadata comprises microformat data.

3. The method of claim 1 wherein the metadata comprises RDFa data.

4. The method of claim 1 wherein the metadata comprises RDF data.

5. The method of claim 1 wherein the metadata comprises eRDF data.

6. The method of claim 1 wherein the metadata is embedded into a webpage.

7. The method of claim 1 wherein the metadata is linked from a webpage.

8. The method of claim 1 comprising storing the templated object model, wherein the stored templated object model is associated with a given search result.

9. The method of claim 8 comprising retrieving the templated object model via a metadata search engine.

10. The method of claim 1 comprising contextualizing the templated object model on basis of the search query.

11. The method of claim 1 wherein generating further comprises generating advertisements for display on a search results page.

12. The method of claim 11 comprising basing the advertisements upon the content of the metadata.

13. A system for using metadata to improve search result presentation, the system comprising:
   one or more client devices coupled to a network;
   a query parser operative to parse a search query and retrieving a ranked list of search results;
   a search results database operative to store a plurality of search results;
   a sponger operative to extract metadata from one or more subsections of a markup language document for each of the search results, the metadata embedded within the markup language document in accordance with a given one of a plurality of formats that semantically identifies a specific construct of the metadata in the markup language document, the given format including class attributes that are unique to the given format of the plurality of formats, and cast the extracted metadata into an object model representing the metadata in the given format;
   a templating module operative to apply the metadata casted in the object model to a given object template based on the object model, the given object template including instructions associated with displaying the metadata on the basis of the given format and linking the metadata to one or more functions based on the given format; and
   a content server coupled to the network operative to receive a search query from a user and generate a search results page comprising the ranked list of search results and the metadata according to the given object template.

14. The system of claim 13 wherein the metadata comprises microformat data.

15. The system of claim 13 wherein the metadata comprises RDFa data.

16. The system of claim 13 wherein the metadata comprises RDF data.

17. The system of claim 13 wherein the metadata comprises eRDF data.

18. The system of claim 13 wherein the metadata is embedded into a webpage.

19. The system of claim 13 wherein the metadata is linked from a webpage.

20. The system of claim 13 wherein the templating module is operative to store the templated object model, wherein the stored templated object model is associated with a given search result.

21. The system of claim 20 wherein the templated object model is retrieved via a metadata search engine.

22. The system of claim 13 wherein the templated object model is contextualized based on the search query.

23. The system of claim 13 wherein the generating further comprises generating advertisements for display on a search results page.

24. The system of claim 23 wherein the advertisements are based upon the content of the metadata.

* * * * *